No. 614,405. Patented Nov. 15, 1898.
W. MÖLLER.
LUBRICATING DEVICE FOR VEHICLES.
(Application filed Dec. 29, 1897.)

(No Model.) 2 Sheets—Sheet 1.

Witnesses:
William Miller.
William Schulz.

Inventor:
Wilhelm Möller
by his attorneys
Roeder & Briesen

No. 614,405. Patented Nov. 15, 1898.
W. MÖLLER.
LUBRICATING DEVICE FOR VEHICLES.
(Application filed Dec. 29, 1897.)
(No Model.) 2 Sheets—Sheet 2.
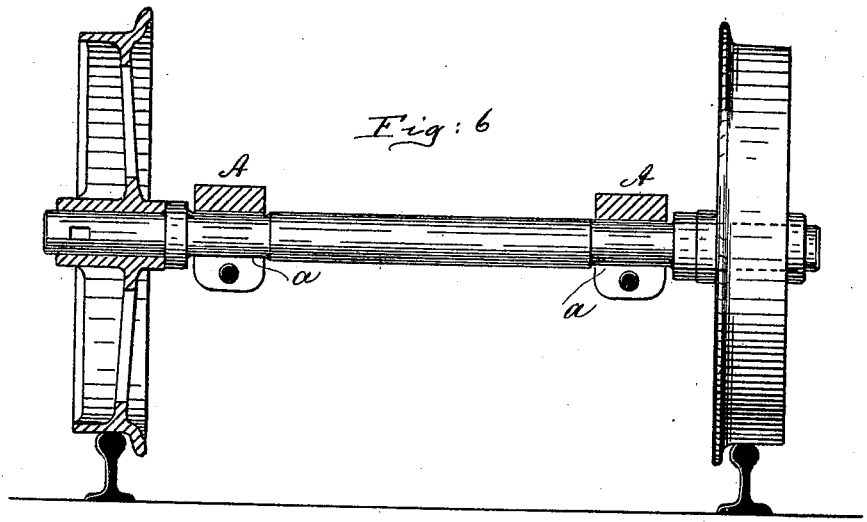
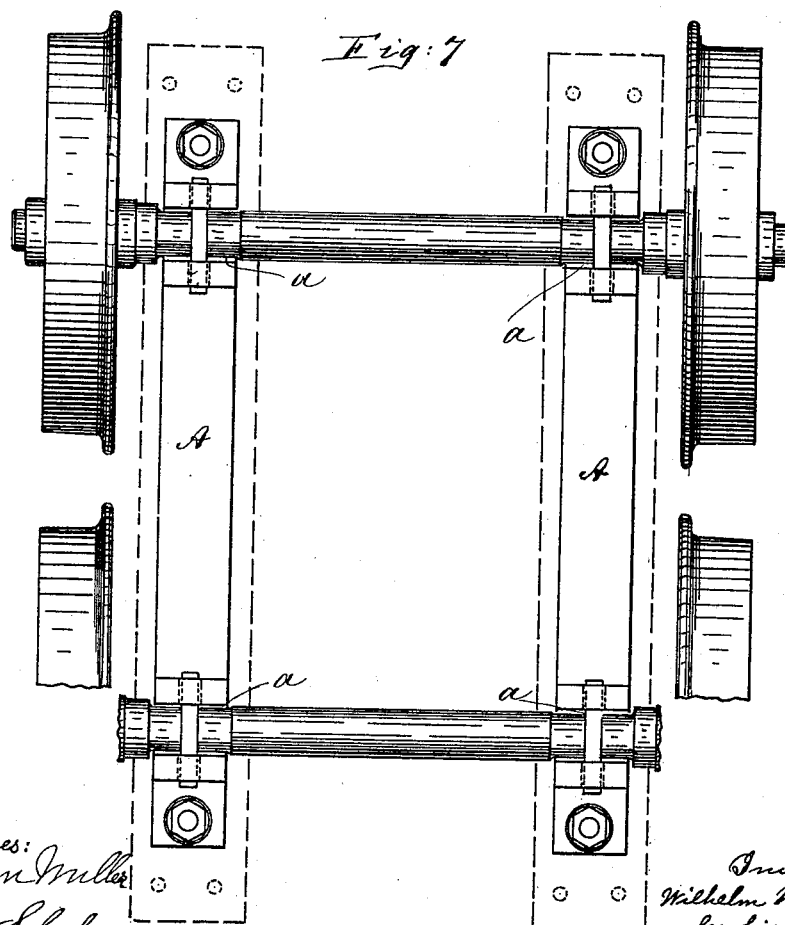

UNITED STATES PATENT OFFICE.

WILHELM MÖLLER, OF UECKENDORF, GERMANY, ASSIGNOR TO FAHREN-DELLER HÜTTE WINTERBERG & JURES, OF BOCHUM, GERMANY.

LUBRICATING DEVICE FOR VEHICLES.

SPECIFICATION forming part of Letters Patent No. 614,405, dated November 15, 1898.

Application filed December 29, 1897. Serial No. 664,384. (No model.)

*To all whom it may concern:*

Be it known that I, WILHELM MÖLLER, a subject of the King of Prussia, German Emperor, residing at Ueckendorf bei Gelsenkirchen, Germany, have invented new and useful Improvements in Axle-Boxes, of which the following is a specification.

This invention relates to an axle-box for carriages and other vehicles which is so constructed as to form a storage for the lubricant and to feed the latter to the axles or journals in a novel and economical manner.

Figure 1:
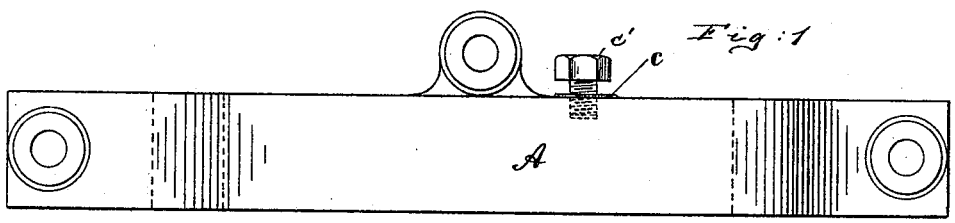
Figure 2:
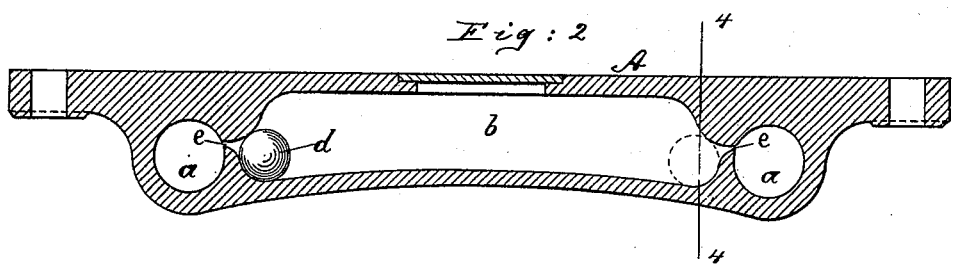
Figure 3:
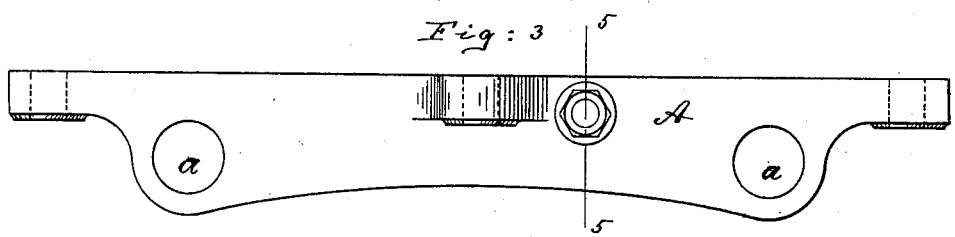
Figure 4:
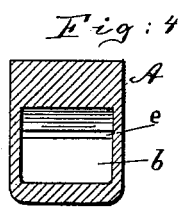
Figure 5:
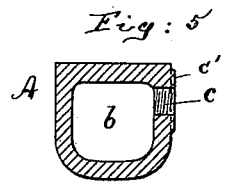

In the accompanying drawings, Figure 1 is a plan of my improved axle-box; Fig. 2, a longitudinal section thereof; Fig. 3, a side elevation; Fig. 4, a cross-section on line 4 4, Fig. 2; Fig. 5, a cross-section on line 5 5, Fig. 3; Fig. 6, a cross-section of a car-truck provided with my improved axle-box, and Fig. 7 a bottom view of the same.

The letter A represents the axle-box of a carriage or other vehicle made with two axle-bearings $a$ $a$, which may be either opened or closed. Between the bearings $a$ there is arranged a storage-chamber $b$, which communicates with both of the bearings by narrow slits $e$.

The chamber $b$ may be charged with a suitable lubricating material through a hole $c$, adapted to be closed by a screw-plug $c'$. The floor of the chamber $b$ is slightly arched, and upon such floor are placed one or more balls or other rolling bodies $d$, which will roll about under the influence of the motion of the vehicle and will force the lubricant through the narrow passages $e$ into the bearings $a$.

The narrow passages or slits $e$ are situated not at the bottom but at the ends of chamber $b$, and they connect with such chamber by flaring mouths, which serve to conduct the lubricant to such slits.

Owing to the motion of the balls, the lubricant in chamber $b$ cannot become stiff or unfit for use, and thus the chamber can be charged with sufficient lubricating material to last for several months.

Owing to the narrow shape of the openings $e$, a discharge of the lubricant from chamber $b$ into bearings $a$, excepting under the influence of the moving balls, will be prevented; but when the balls are in motion their impetus will cause the lubricant to be forcibly ejected through the slits and against the axles.

By my invention there is effected a thorough utilization and a small expenditure of the lubricant, and friction at the bearing surfaces is reduced to a minimum, while the axle-boxes require to be charged with lubricant only at long intervals.

I claim—

1. An axle-box provided with a bearing, a storage-chamber having a discharge-opening at the end thereof which communicates with the bearing, and a rolling body within the storage-chamber, substantially as specified.

2. An axle-box provided with a bearing, a storage-chamber having at its end a narrow discharge-opening with flaring mouth, which opening communicates with the bearing, and a rolling body within the storage-chamber, substantially as specified.

In testimony whereof I have signed my name to this specification in the presence of two subscribing witnesses.

WILHELM MÖLLER.

Witnesses:
WILLIAM ESSENWEIN,
JOH. BECKER.